United States Patent Office 3,015,620
Patented Jan. 2, 1962

3,015,620
MANUFACTURE OF A SILICA-ZIRCONIA CATALYST FOR CONVERSION OF HYDROCARBONS
Charles J. Plank, Woodbury, Edward J. Rosinski, Almonesson, and Robert B. Smith, Glassboro, N.J., assignors to Socony Mobil Oil Company, Inc., a corporation of New York
No Drawing. Filed Apr. 2, 1959, Ser. No. 803,552
20 Claims. (Cl. 208—119)

This invention relates to the catalytic conversion of hydrocarbons and to an improved catalyst for effecting said conversion. More specifically, the invention relates to the catalytic cracking of hydrocarbon oils in the presence of a new and improved catalyst. In one embodiment, the invention is concerned with an improved silicia-zirconia cracking catalyst characterized by unusual selectivity and activity in the conversion of hydrocarbons. In another embodiment, the invention is directed to an improved method for preparing silica-zirconia composites of such characteristics useful in catalytic cracking of heavy petroleum fractions to lighter materials boiling in the gasoline range.

As is well known, there are numerous materials, both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory it is subject to improvement, particularly as regard to the selectivity and activity desirable in a present day cracking catalyst.

It has heretofore been known to produce catalytic composites of silica and zirconia in accordance with various methods. Thus, is has been proposed to prepare silica-zirconia catalysts by impregnation of silica gel with zirconium nitrate and to subsequently decompose the metal salt to zirconia. Molded mixtures of silica and zirconia precipitates have also been suggested as hydrocarbon conversion catalysts. While the results obtained utilizing such catalysts have indicated that composites of silica and zirconia are useful in catalytically promoting the conversion of hydrocarbons, the activity of the catalysts prepared by the foregoing methods has not been of significant commercial interest as compared with available silica-alumina hydrocarbon conversion catalysts as to constitute any appreciable improvement over the latter. Accordingly, the industry has continued to use as petroleum cracking catalysts, composites of silica and alumina.

The present invention affords a commercially attractive silica-zirconia catalyst characterized by outstanding selectivity and activity in the conversion of hydrocarbons. The improvement arises from the method of manufacture which comprises a particular combination of procedural steps including the reaction of a water-soluble zirconium compound and a silicate selected from the group consisting of an alkali metal silicate and an organic silicate ester in such proportion as to yield a gelable hydrosol having a zirconia content, on a dry solids basis, of between about 2 and about 20 percent by weight and a pH in excess of 6, permitting the resulting sol to set forming a silica-zirconia gel, reducing the pH of said gel to below 5 and activating the same by maintaining the gel under such conditions of reduced pH while in contact with an aqueous medium at a temperature in the approximate range of 150 to 220° F. for a least about 1 hour under conditions of substantially atmospheric pressure.

After activation in aqueous medium, zeolitic impurities, if any, are removed from the gel and the latter is washed free of water-soluble matter, dried and calcined. In the foregoing procedure, it has been found that the activation step of treating the silica-zirconia gel in an aqueous medium at the specified conditions and the control of pH during gelation and such activation step are essential in achieving the unusually effective selectivity and activity characterizing the present silica-zirconia catalyst. It has further been found, in accordance with the present invention, that not only is the activation step essential, but that also the conditions required during this step to obtain the desired catalyst selectivity are very critical. Thus, the pH during the activation step is essentially below 5 and preferably below 3. The pH of gel formation, on the other hand, is essentially above 6 permitting the attainment of silica-zirconia gels characterized by particularly favorable gel properties as well as by a short time of set, i.e. generally less than 2 hours and more particularly less than 20 seconds. Hydrogels prepared at a pH above 6 are much more susceptible to activation than those prepared below 6 pH. The temperature of the activation treatment involving the use of an aqueous medium is above about 150° F. and preferably above 175° F. and generally does not exceed 220° F. The time required for activation is generally at least 1 hour and may extend up to 48 hours or longer. Preferably, the activation period is at least 2 hours and usually within the approximate range of 2 to 24 hours.

The intermediate hydrogel state obtained in preparation of present catalysts is to be distinguished from a gelatinous precipitate. True all embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

The zirconium compound employed in the present process is a water-soluble compound and suitably a water-soluble mineral acid salt of zirconium such as for example, zirconium nitrate, zirconium sulfate and zirconyl chloride. Of this group, zirconium sulfate is accorded preference, since under comparable conditions of formation, catalysts prepared using this salt showed the greatest improvement in activity and selectivity. Zircon sand is a suitable source of zirconium compound. The zirconia content of such sand can be converted to zirconium sulfate through caustic fusion at temperatures exceeding 1000° F. and subsequent leaching with sulfuric acid.

The silicate reactant is generally an alkali metal silicate and particularly sodium silicate, although silicates of the other alkali metals, such as, for example, potassium silicate might likewise be employed. An organic silicate ester, for example ethyl ortho silicate, may also be employed, as the source of silica.

The solutions of zirconium compound and silicate reactant are intimately mixed in such proportions as to yield a gelable sol having a zirconia content, on a dry basis, of between about 2 and about 20 and preferably between about 5 and about 15 percent by weight and a pH of above 6 and generally not exceeding about 10.

The resulting product is a hydrosol of silica and zirconia characterized by an inherent capacity to set to a hydrogel upon lapse of a suitable interval of time, extending from a few seconds up to several hours depending on pH, temperature and solids concentration, without addition to or subtraction from the hydrosol of any substance. By following the teachings of this invention, the time of gelation can be very rapid, i.e. less than 20 seconds which permits the gel to be prepared directly in the form of spheroidal particles resulting in a product of improved physical properties and in definite economic advantages in the manufacture of the catalyst. In addition to affording rapid gelation, the high pH of gel formation has been found to give rise to a more selective catalyst as compared with a comparable gel in which the pH of formation is below 6.

The silica-zirconia hydrogel, so obtained, is thereafter treated to reduce the pH thereof to below 5 and preferably less than 3 but greater than 1. To accomplish such purpose, the hydrogel is contacted with an acidic fluid substantially immediately after formation. While the lapse of a short interval of time is permissible, it is generally desirable to reduce the pH of the silica-zirconia hydrogel immediately upon formation to less than 5. Maintaining the hydrogel under conditions of pH at which formation is effected for a considerable period of time was found to be detrimental to the selectivity of the finished catalyst. Generally, the hydrogel is contacted with an aqueous solution of an acid or an acidic salt of sufficient concentration to effectively reduce the hydrogel pH to less than 5. Usually, an inorganic acid and particularly a dilute solution of a mineral acid such as nitric, hydrochloric or sulfuric acid in the form of a 1 to 10 weight percent solution is employed for this purpose.

The hydrogel of reduced pH is then activated by maintaining the same under the aforementioned conditions of reduced pH while in contact with an aqueous medium at a temperature in the approximate range of 150 to 220° F. and more particularly between about 175 and about 220° F. at substantially atmospheric pressure for at least 1 hour and generally not exceeding about 48 hours. This step is critical in achieving the improved silica-zirconia composite of this invention. In accordance with such step, the hydrogel is suitably covered with an acidic solution to maintain the pH of the hydrogel during activation within the approximate range of 1 to 5 and preferably 1 to 3. While the hydrogel, after treatment to reduce its pH of formation as described, may be transferred or conducted to an aqueous medium maintained at the elevated temperature specified hereinabove, it is generally preferred to effect activation of the hydrogel in the same solution used for reduction of pH. Thus, it is contemplated that in a preferred operation, the silica-zirconia hydrogel after formation at a pH in excess of 6 is conducted to an aqueous dilute solution of an acid or acid salt wherein the pH of the hydrogel is immediately brought to below 5 and the hydrogel is thereafter maintained in such solution at a temperature of between 150 and 220° F. for a sufficient period to accomplish the desired activation. The pH of the hydrogel during the activation treatment is an important factor having a direct bearing on the ultimate catalyst activity and in accordance with the process of this invention should be less than 5 and preferably below 3 in order to obtain a catalyst of high cracking activity.

After the activation treatment, exchangeable or zeolitic impurities, if present are removed from the hydrogel in any feasible manner. While as a practical matter, all or a large proportion of such zeolitic impurities may be removed during the course of the activation treatment with the aqueous medium containing an acidic compound, any remaining zeolitic matter is suitably removed by base-exchange with aqueous solutions of mineral acids such as hydrochloric and sulfuric acids; solutions of ammonium salts which act to replace metal impurities with ammonium which is later removed by calcining; and solutions of multivalent metal salts; particularly a zirconium salt which may be the same or a different zirconium salt from that employed in initial formation of the hydrogel. When base-exchanging the silica-zirconia hydrogel with an acid, a limited and controlled amount must obviously be used to avoid redissolving the zirconia. When exchanging with ammonium compounds any excesses will be calcined out in the final steps of catalyst manufacture and when using any zirconium or other multivalent metal salt which does not adversely affect the catalytic properties, excesses may be used and left on the composite.

After removal of zeolitic impurities, the hydrogel is water washed free of soluble excess ions. The resulting catalytic composite of silica and zirconia is then completed by drying in air or superheated steam at a temperature between about 200 and 400° F. for a period of between about 4 and 24 hours and/or by calcining at a temperature between about 800 and about 1800° F. for approximately 2 to 8 hours or more.

In some instances, it may be desirable to introduce into the silica-zirconia hydrosol a quantity of solid powdered material insoluble therein having a weight mean particle diameter of between 1 and 5 microns and preferably between 2 and 4 microns. The amount of powdered material, so introduced, is generally between about 2 percent and about 40 percent by volume and preferably between about 15 and about 30 percent by volume of the dried gel product. The powder-containing silica-zirconia sol sets to a hydrogel after lapse of a suitable period of time and the resulting hydrogel is thereafter dried to a gel at a temperature below the fusion point of the incorporated powder. It has been found that a silica-zirconia gel resulting from the setting of a sol containing powdered material of the aforementioned particle size and drying of the resulting hydrogel at a temperature below the fusion point of the added material has a substantially greater resistance to attrition and improved diffusivity as compared with corresponding silica-zirconia gels which do not contain such added powder. The powdered material may be added by dispersing in an already prepared hydrosol or, as is preferable, when the hydrosol is characterized by a short time of gelation the powder may be added to one or more of the reactants used in forming the hydrosol or may be mixed in the form of a separate stream with streams of the hydrosol-forming reactants in a mixing nozzle or other means where the reactants are brought into intimate contact. In addition to having the above particle size, the powder solid incorporated in the silica-zirconia hydrosol should necessarily be insoluble therein and should further be characterized by being infusible at the hydrogel drying temperature. The powder incorporated in the silica-zirconia sol in accordance with the presently described embodiment may be catalytically active or an inert material. As indicated hereinabove, the particular powdered material to be incorporated in the hydrosol will be chosen so as to be insoluble therein and to be infusible at the drying temperature. Observing these features, suitable representative materials having a weight mean particle diameter of 1 to 5 microns include dry gels or gelatinous precipitates such as those of silica, alumina, magnesia, chromia, molybdena, zirconia, thoria, titania, and the like including composites thereof. Thus, a particularly preferred powdered material for incorporation in the sol includes pulverized silica-zirconia gel fines having a weight mean particle diameter of 1 to 5 microns. Other suitable materials include zircon sand (zirconium silicate) as well as other metal silicates, metals and metal oxides including aluminum oxide, chromium trioxide, molybdenum oxide, magnesium oxide, manganese oxide, zirconium oxide and silicon oxide in their various forms and modifications. Thus, the introduction of alpha alumina powder in the silica-zirconia sol has been found to afford a product of improved properties.

The catalyst may be prepared in any desired mechanical form according to the specific purpose for which it is intended. Either before or after calcination, it can be broken into lumps or granules, or it can be ground to a fine powder adapted for use in the suspensoid or fluidized-solids process. Alternatively, the catalyst can be formed into pills, pellets or other suitable shapes, preferably prior to the calcination step for use in fixed bed or compact moving bed operations. In this case, the catalytic mixture is partially dried, ground to a powder preferably smaller than 30 mesh (Tyler), combined with a suitable lubricant such as graphite, hydrogenated coconut oil, stearic acid, rosin or the like and shaped by extrusion, molding or by other means known in the art. Particles having dimensions ranging from about ⅛″ x ⅛″ to ½″ x ½″ are generally satisfactory. The shaped particles can then be further dried and/or calcined as described above.

In one embodiment of the invention, the initially prepared hydrosol is introduced in the form of globules to a water-immiscible fluid such as into a column of water-immiscible liquid, for example, an oil medium wherein the globules of hydrosol set to spheroidal bead-like particles of hydrogel. Larger size spheres are ordinarily within the range of from about ¹⁄₆₄ to about ½ inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-zirconia cracking catalyst particles are subjected to continuous movement. As applied to the stationary bed, spheroidal gel catalyst particles provide effective contact between the reactants and the catalyst by avoiding channeling.

The resulting improved silica-zirconia catalyst is useful in numerous processes for the conversion of hydrocarbons. It has been found, for example, to be highly effective in the cracking of heavy petroleum oils, such as gas oils, heavy naphthas and the like to lighter materials boiling in the gasoline range at conventional catalytic cracking conditions including temperatures in the range of about 800° F. to 1050° F. and pressure ordinarily between 1 and 5 atmospheres absolute. The present catalyst is also suitable for use in various other hydrocarbon conversion reactions.

The following examples will serve to illustrate the invention hereinabove described without limiting the same:

EXAMPLE 1

A silica-zirconia catalyst was produced from the following reactants:

Solution A which consisted of 690 cc. of diluted "N" brand sodium silicate containing 0.193 gram $SiO_2$/cc.

Solution B which was prepared by adding 300 cc. $Zr(SO_4)_2 \cdot 4H_2O$ solution containing 0.05 gram $ZrO_2$/cc. and 35 cc. $H_2SO_4$ (48.85 weight percent aqueous solution) to 1470 cc. of water.

Solutions A and B were quickly mixed with agitation. The resulting hydrogel had a pH of 8.5. Gelation to a firm hydrogel occurred in 10–15 seconds at a room temperature of about 75° F.

The resulting hydrogel, after standing about 30 minutes at approximately the above temperature, was cut into cubes and transferred to containers wherein the cubes were contacted with a 1 percent by weight aqueous solution of $H_2SO_4$ which caused the pH of the hydrogel to drop to 1.7. The hydrogel was then activated by maintaining the same in the above solution for 24 hours at 175° F. during which time the pH rose to 2.0.

The treated hydrogel was then base-exchanged to remove zeolitic impurities by contacting with a 2 weight per cent aqueous solution of ammonium chloride involving three 2-hour treatments and one overnight treatment, employing approximately one volume of ammonium chloride solution per volume of gel for each treatment.

The base-exchanged hydrogel was then washed with water until substantially free of chloride ion, dried overnight at 280° F. and calcined 10 hours at 1200° F.

EXAMPLE 2

A silica-zirconia catalyst was produced from the following reactants:

Solution A which consisted of 690 cc. of diluted "N" brand sodium silicate containing 0.193 gram $SiO_2$/cc.

Solution B which was prepared by adding 300 cc. $Zr(SO_4)_2 \cdot 4H_2O$ solution containing 0.05 gram $ZrO_2$/cc. and 47 cc. $H_2SO_4$ (48.85 weight percent aqueous solution) to 1485 cc. of water.

Solutions A and B were mixed quickly with rapid agitation. The resulting hydrosol had a pH of 6.3. Gelation to a firm hydrogel occurred in about 30 seconds at a room temperature of about 75° F.

The resulting hydrogel, after standing overnight at approximately the above temperature was cut into cubes and transferred to containers wherein the cubes were contacted with a 1 percent by weight aqueous solution of $H_2SO_4$ which caused the pH of the hydrogel to drop to 1.7. The hydrogel was then activated by maintaining the same in solution for 24 hours at 175° F. during which time the pH rose to 2.5.

The treated hydrogel was then base-exchanged, washed and dried as in Example 1 and thereafter calcined 10 hours at 1000° F.

EXAMPLE 3

A catalyst of silica and zirconia was produced from the following reactants:

Solution A which consisted of 2070 cc. of diluted "N" brand sodium silicate containing 0.193 gram $SiO_2$/cc.

Solution B which was prepared by adding 900 cc. $Zr(SO_4)_2 \cdot 4H_2O$ solution containing 0.05 gram $ZrO_2$/cc. and 68.3 cc. $H_2SO_4$ (95.2% weight) to 4530 cc. of water.

Solutions A and B were mixed with rapid mechanical agitation. The resulting hydrosol had a pH of 3.6. Gelation to a firm hydrogel occurred in about 8 hours at a room temperature of about 75° F.

The resulting firm hydrogel, after standing overnight at approximately the above temperature, was cut into cubes and transferred to containers wherein the cubes were covered with water and maintained at a temperature of 175° F. for 24 hours.

The treated hydrogel was then base-exchanged, washed, dried and calcined as in Example 1.

Cracking characteristics of the above catalysts of Examples 1, 2, and 3 were determined upon subjecting each of the catalysts to the Cat-C test. In this test, a wide-range Mid-Continent gas oil, boiling initially from 450° F. to 95 percent at 950° F., is passed over the catalyst sample at a standard set of conditions involving a liquid hourly space velocity of 2, a catalyst to oil ratio of 3, and a temperature of 900° F. To observe selectivity differences independent of the conversion level of the individual silica-zirconia catalyst samples, each catalyst is compared to a standard commercial silica-alumina cracking catalyst containing about 10 weight percent alumina and 90 weight percent silica, giving the same conversion as the appropriate silica-zirconia catalyst. The results for Examples 1, 2 and 3 are set forth in Table I.

In this comparison, each of the catalysts were treated with 100 percent steam for 10 hours at atmospheric pressure at 1200° F. before the cracking test to bring the activity to a reproducible level.

Table I

| Example | pH of formation | Gel time | pH during activation treatment | Conversion vol. percent | Difference from $SiO_2$—$Al_2O_3$* | |
|---|---|---|---|---|---|---|
| | | | | | Gasoline vol. percent | Coke weight percent |
| 1 | 8.5 | 10-15 sec | 1.7-2.0 | 52.1 | +3.9 | -0.5 |
| 1 | 6.3 | 30 sec | 1.7-2.5 | 48.4 | +3.7 | +0.3 |
| 3 | 3.6 | 8 hrs | 3.6 | 46.8 | +1.8 | +0.8 |

*Value for $SiO_2$—$ZrO_2$ catalyst minus value for $SiO_2$—$Al_2O_3$ at the same conversion.

From the above data, it is evident from Examples 1 and 2 that formation of the silica-zirconia hydrogel at the higher pH and subsequent reduction in pH during activation treatment has several advantages over comparable formation of the hydrogel initially at a low pH as illustrated by Example 3. First, the gel time is considerably shortened. This permits production of the hydrogel in particulate form directly from the hydrosol without intermediate formation of a mass of gel which is subsequently broken up and formed into particles of suitable size and shape. Secondly, the activity of the catalysts, after steam treatment, i.e. the steam stability, is higher for the catalysts of Examples 1 and 2 prepared at 8.5 and 6.3 pH. Thirdly, more gasoline and less coke is formed with the latter catalysts.

A series of silica-zirconia catalysts was prepared by methods analogous to that used in preparation of the catalyst of Example 1 to determine the effect of zirconia content on the catalytic activity of the product catalyst. In this series (Examples 4–7), activation was carried out by contacting the silica-zirconia gel formed at 8.5 pH with a 1 percent by weight aqueous solution of $H_2SO_4$ for 24 hours at a temperature of 200° F. The treated hydrogel was then base-exchanged to remove zeolitic impurities by contacting with a 2 weight percent aqueous solution of ammonium chloride involving three 2-hour treatments and one overnight treatment, employing approximately one volume of ammonium chloride solution per volume of gel for each treatment. The base-exchanged hydrogel was then washed with water until substantially free of chloride ion, dried overnight at 280° F. and calcined 10 hours at 1000° F. The only variation within this series was in the content of zirconia in the finished catalyst. The Cat-C evaluations of these catalysts are set forth in Table II below.

Table II

| Example | 4 | 5 | 6 | 7 |
|---|---|---|---|---|
| Description: Percent $ZrO_2$ in hydrogel | 5 | 10 | 15 | 25 |
| Physical properties: | | | | |
| Pore volume cc./g | 0.43 | 0.40 | | 0.29 |
| Density g./cc.: | | | | |
| Fresh | 0.61 | 0.67 | 0.67 | 0.77 |
| Steamed[a] | 0.70 | 0.77 | 0.83 | 0.86 |
| Surface area m.²/g.: | | | | |
| Fresh | 686 | 625 | 535 | 475 |
| Steamed[a] | 354 | 351 | 333 | 250 |
| Chemical composition: | | | | |
| $ZrO_2$, percent weight | 3.94 | 7.51 | 14.6 | 25.7 |
| Na, percent weight | 0.01 | 0.01 | <0.01 | 0.02 |
| $SO_4$, percent weight | 0.10 | 0.10 | 0.27 | 0.33 |

See footnotes at end of table.

Table II—Continued

CAT-C EVALUATION OF FRESH CATALYSTS

| Example | 4 | 5 | 6 | 7 |
|---|---|---|---|---|
| Conversion, vol. percent | 56.9 | | 70.9 | |
| Gasoline, vol. percent | 47.2 | | 53.0 | |
| Difference from $SiO_2$—$Al_2O_3$:[b] | | | | |
| Gasoline, vol. percent | +3.0 | | +1.7 | |
| Coke, weight percent | -0.9 | | 0.0 | |

CAT-C EVALUATION OF STEAMED CATALYSTS

| Example | 4 | 5 | 6 | 7 |
|---|---|---|---|---|
| Conversion, vol. percent | 49.6 | 58.9 | 60.7 | 62.5 |
| Gasoline, vol. percent | 44.1 | 49.4 | 50.0 | 48 |
| Difference from $SiO_2$—$Al_2O_3$:[b] | | | | |
| Gasoline, vol. percent | +4.1 | +4.0 | +3.7 | +0.8 |
| Coke, weight percent | -0.5 | -0.9 | -1.4 | +0.8 |

[a] Steamed 20 hrs. at 1,225° F. in 100% steam at atmospheric pressure.
[b] Value for $SiO_2$—$ZrO_2$ catalyst minus value for $SiO_2$—$Al_2O_3$ at the same conversion.

It will be seen from the foregoing data that the gasoline advantage for each of the catalysts of Examples 4–6 is about the same, i.e. +4 volume percent. The conversion level of the catalyst of Example 4 containing about 4 percent zirconia is approximately 10 volume percent less than the catalysts of Examples 5, 6 and 7 containing 7.5 to 25 percent zirconia respectively. The steamed catalysts show increased coke advantage with increasing zirconia content from 5 to 15 percent but at 25% zirconia the coke advantage is lost. Each of the catalysts of Example 4-6 afforded a substantial improvement in volume percent of gasoline over corresponding silica-alumina catalysts. The catalysts of the invention are thus desirably characterized by a zirconia content of between about 2 and about 20 and particularly between about 5 and about 15 weight percent.

Another series of silica-zirconia catalysts was prepared to illustrate the conditions for activation. These catalysts were produced in accordance with the following procedure:

EXAMPLE 8

Silica-zirconia gel was prepared by mixing streams of:
(1) Sodium silicate solution
(2) Acid-zirconium sulfate solution The sodium silicate solution was composed of 40 weight percent of water and 60 weight percent N-Brand sodium silicate.

The acid-zirconium sulfate solution contained 6.61 weight percent zirconium sulfate, 89.7 weight percent water and 3.69 weight percent sulfuric acid. This solution contained 0.0227 g. $ZrO_2$/cc.

Three hundred sixty-eight cc. (368) per minute of the sodium silicate solution and 392 cc. per minute of the acid-zirconium sulfate solution were mixed in a mixing nozzle to form a sol containing, on a dry basis, 10 percent by weight zirconia and which set to a hydrogel in 2.1 seconds at 65° F. The sol was formed into spheroidal hydrogel beads by introducing globules of the sol into an oil medium. The resulting hydrogel particles having a pH of 8.5 were contacted with a 2 percent by weight aqueous solution of $H_2SO_4$ for 2 hours at 200° F. The treated hydrogel particles were thereafter base-exchanged, washed, dried and calcined as in Examples 4–7.

The catalysts of Examples 9 and 10 were prepared in a manner identical to that of Example 8 except that the time employed for activation was varied to the extent shown below. The Cat-C evaluation of these catalysts are set forth in Table III:

Table III

| Example | 8 | 9 | 10 |
|---|---|---|---|
| Description of hydrogel | (a) | (a) | (a) |
| Activation: | | | |
| Solution | (b) | (c) | (c) |
| Time, hrs | 2 | 4 | 19 |
| Temp., °F | 200 | 200 | 200 |
| pH off | 2.1 | 2.3 | 2.4 |
| Physical properties: | | | |
| Pore volume fresh cc./g | 0.35 | 0.37 | 0.45 |
| Density, g./cc: | | | |
| Fresh | 0.82 | 0.79 | 0.75 |
| Steamed d | 0.98 | 0.94 | 0.82 |
| Surface Area, m.²/g.: | | | |
| Fresh | 591 | 590 | |
| Steamed d | 314 | 314 | 352 |
| Chemical properties: | | | |
| $ZrO_2$ percent weight | 7.97 | 7.83 | |
| Na, percent weight | 0.01 | 0.01 | |
| $SO_4$, percent weight | 0.11 | 0.22 | |

CAT-C EVALUATION OF FRESH CATALYST

| | | | |
|---|---|---|---|
| Conversion, vol. percent | 71.0 | 70.3 | 68.2 |
| Gasoline, vol. percent | 54.1 | 54.2 | 53.8 |
| Difference from $SiO_2$—$Al_2O_3$: e | | | |
| Gasoline, vol. percent | +2.8 | +3.2 | +3.6 |
| Coke, weight percent | −0.1 | −0.5 | −0.9 |

CAT-C EVALUATION OF STEAMED d CATALYST

| | | | |
|---|---|---|---|
| Conversion, vol. percent | 61.0 | 60.9 | 58 |
| Gasoline, vol. percent | 50.4 | 51.1 | 48.8 |
| Difference from $SiO_2$—$Al_2O_3$: e | | | |
| Gasoline, vol. percent | +3.9 | +4.6 | +4.0 |
| Coke, weight percent | −1.0 | −1.3 | −1.7 | a 10% $ZrO_2$ beads formed at 8.5 pH.
b 2% $H_2SO_4$.
c ½ V/V beads.
d Steamed 20 hrs. at 1,225° F. with 100% steam at atmospheric pressure.
e Value for $SiO_2$—$ZrO_2$ catalyst minus value for $SiO_2$—$Al_2O_3$ at the same conversion.

It will be seen from the above data that activation for 4 hours at 200° F. improves the selectivity of the catalyst slightly more than corresponding activation at 2 hours. An additional increase in activation time to 19 hours shows a decrease in the conversion level and gasoline advantage. However, in this case, the coke advantage improved. The particular period required for activation will depend in part on the nature, concentration and temperature at which such step is carried out and may extend from 1 hour upwards to 48 hours or more. Generally, the activation time will be greater than 2 hours and usually within the range of 2 to 24 hours.

A further comparative series of silica-zirconia catalysts was prepared to show the need for high temperature during the activation step. The catalysts of Examples 11 and 12 were prepared by a method analogous to that of Example 8. The catalyst of Example 11 was treated at room temperature while the catalyst of Example 12 underwent activation treatment at 200° F. The results are set forth in Table IV below:

Table IV

| Example | 11 | 12 |
|---|---|---|
| Description | (a) | (a) |
| Activation: | | |
| Time, hrs | 24 | 24 |
| Temp., °F | R.T. | 200 |
| Solution, percent $H_2SO_4$ | 2 | 2 |
| pH off | 1.2 | 2.1 |
| Physical properties: | | |
| Pore volume, cc./g | 0.33 | 0.43 |
| Apparent dens. g./c.: | | |
| Fresh | 0.87 | 0.74 |
| Steamed b | 1.01 | 0.84 |
| Surface area m.²/g: | | |
| Fresh | 532 | 642 |
| Steamed b | 293 | 351 |
| Chemical composition: | | |
| $ZrO_2$, weight percent | 8.65 | 7.81 |
| Na, weight percent | 0.02 | 0.008 |
| $SO_4$, weight percent | <0.10 | 0.11 |

See footnotes at end of table.

Table IV—Continued

CAT-C EVALUATION OF FRESH CATALYSTS

| Example | 11 | 12 |
|---|---|---|
| Conversion, volume percent | 67.7 | 67 |
| Gasoline, volume percent | 50.6 | 52.0 |
| Difference from $SiO_2$—$Al_2O_3$: c | | |
| Gasoline, volume percent | +0.6 | +2.3 |
| Coke, weight percent | +0.1 | −1.0 |

CAT-C EVALUATION OF STEAMED b CATALYST

| | | |
|---|---|---|
| Conversion, volume percent | 51.9 | 57.6 |
| Gasoline, volume percent | 44.6 | 48.3 |
| Difference from $SiO_2$—$Al_2O_3$: c | | |
| Gasoline, vol. percent | +3.2 | +3.7 |
| Coke, weight percent | +0.8 | −1.2 | a Formed at 8.5 pH
b Steamed 20 hrs. at 1,225° F. in 100% steam at atmospheric pressure.
c Value for $SiO_2$—$ZrO_2$ catalyst minus value for $SiO_2$—$Al_2O_3$ at same conversion.

It is evident from the foregoing data that treatment in dilute acid solution at room temperature was not sufficient to obtain the desired gasoline and coke advantage realized in accordance with the catalyst prepared by the process of the invention. In accordance with the procedure described herein, activation is desirably effected at a temperature within the approximate range of 150° F. to 220° F.

EXAMPLE 13

Silica-zirconia hydrogel in bead form was prepared by a method analogous to that of Example 8. In this example, the beads were activated by treatment in an aqueous 2% $H_2SO_4$ solution for 8 hours at 150° F. The treated hydrogel after base-exchange, washing and drying as in Example 8 and after tempering 5 hours at 1600° F. followed by steam treatment was evaluated in a gas oil cracking test. At a conversion of 56.6%, the gasoline advantage (volume percent) over $SiO_2$—$Al_2O_3$ was 4.4%. This result shows that 150° F. is a satisfactory activation temperature. In addition, it illustrates the unusual stability of this type of catalyst to high temperature exposure.

The following example will serve to illustrate the use of zircon sand as a source of zirconium compound. Thus, the zirconia content of zircon sand can be converted to zirconium sulfate through caustic fusion at 1050–1150° F. and leaching in sulfuric acid.

EXAMPLE 14

To 250 grams of zircon sand (67% $ZrO_2$) was added 375 grams of NaOH pellets. The mixture was heated 3½ hours at 1050° F. The resulting product was contacted with 4 liters of water overnight at room temperature and then filtered and washed. The residue from the washing was contacted with 800 cc. of ⅔ $H_2SO_4$—⅓ $H_2O$ solution at 300° F. reflux temperature for 72 hours. The resulting solution was filtered and diluted with water to a total volume of 5 liters. The final dilute solution of zirconium sulfate contained 0.034 gram $ZrO_2$/cc.

Solution A was prepared by adding 300 cc. of NaOH solution containing 25 percent weight NaOH to 2800 cc. of dilute N-Brand sodium silicate solution containing 0.193 gram $SiO_2$/cc.

Solution B was prepared by diluting 1764 cc. of the zirconium sulfate solution prepared as described above containing 0.034 gram $ZrO_2$/cc., with 5136 cc. $H_2O$.

Solution A was mixed with solution B with rapid agitation. The resulting hydrosol had a pH of 8.5. Gelation to a firm hydrogel occurred in about 15 seconds. The hydrogel was cubed and transferred to containers wherein the cubes were contacted with one percent weight aqueous solution of $H_2SO_4$ which caused the pH of the hydrogel to drop to 2.2 pH. The hydrogel was heated in this solution for 24 hours at 200° F.

The treated hydrogel was then base-exchanged, washed, dried, and calcined as in Examples 4–7. The Cat-C evaluation is shown for the fresh and steamed catalyst in Table V below:

Table V

|  | Conversion vol. percent | Gasoline vol. percent | Difference From $SiO_2$—$Al_2O_3$ [a] | |
|---|---|---|---|---|
|  |  |  | Gasoline vol. percent | Coke weight percent |
| Fresh catalyst | 65.9 | 54.4 | +5.1 | −1.6 |
| Steamed catalyst [b] | 54.9 | 47.5 | +4.4 | −0.9 |

[a] Value for $SiO_2$—$ZrO_2$ catalyst minus value for $SiO_2$—$Al_2O_3$ at same conversion
[b] Steamed 20 hrs. at 1225° F. in 100% steam at atmospheric pressure.

The following example will serve to illustrate the use of ethyl ortho silicate as the source of silica and zirconyl chloride as the source of zirconia in preparation of the silica-zirconia catalyst.

EXAMPLE 15

A silica-zirconia catalyst was produced from the following reactants.

Solution A was prepared by mixing 5220 cc. of tetra ethyl orthosilicate-ethyl alcohol containing 0.104 gram $SiO_2$/cc. and 1200 cc. of $ZrOCl_2 \cdot 8H_2O$ ethyl alcohol solution containing 0.05 gram $ZrO_2$/cc. and 60 cc. of 4 Normal $HNO_3$.

Solution B consisted of 1080 cc. of 3.06 Norman $NH_4OH$ solution.

Solutions A and B were mixed together with rapid agitation. The resulting hydrosol had a pH of 8.5 and gelled to a firm hydrogel in 90 seconds. The hydrogel was cubed and transferred to containers wherein the cubes were contacted with HCl for 24 hours at 200° F. The pH was controlled within the approximate range of 2 to 3 by the addition of HCl.

The treated hydrogel was then base-exchanged, washed, dried and calcined as in Examples 4–7. The Cat-C evaluation is shown for the fresh and steamed catalyst in Table VI below:

|  | Conv. vol. percent | Gas. vol. percent | Difference from $SiO_2$—$Al_2O_3$ [a] gas., vol. percent |
|---|---|---|---|
| Fresh catalyst | 66.2 | 50.6 | +1.3 |
| Steamed catalyst [b] | 48.8 | 41.6 | +2.1 |

[a] Value for $SiO_2$—$ZrO_2$ catalyst minus value for $SiO_2$—$Al_2O_3$ at the same conversion.
[b] Steamed 20 hrs. at 1225° F. in 100% steam at atmospheric pressure.

Another series of silica-zirconia catalysts was prepared to illustrate that solutions of sulfuric acid and zirconium sulfate or zirconium sulfate alone could be used as well as sulfuric acid to activate the hydrogel.

EXAMPLE 16

Silica-zirconia gel was prepared by mixing streams of:
(1) Sodium silicate solution
(2) Acid-zirconium sulfate solution.

The sodium silicate solution was composed of 40 weight percent of water and 60 weight percent of N-Brand sodium silicate.

The acid-zirconium sulfate solution contained 3.16 weight percent zirconium sulfate, 91.4 weight percent $H_2O$ and 5.44 weight percent $H_2SO_4$. This solution contained 0.01 gram $ZrO_2$/cc.

Four hundred (400) cc. per minute of the sodium silicate solution and 418 cc. per minute of the acid-zirconium sulfate solution were mixed in a mixing nozzle to form a sol containing, on a dry basis, 5 percent by weight zirconia. The sol was formed into spheroidal hydrogel beads by introducing globules of the sol into an oil medium. The globules of hydrosol set to a hydrogel in 2.1 seconds at 60° F. The resulting hydrogel particles having a pH of 8.5 were contacted with 2 percent by weight aqueous solution of $H_2SO_4$ for 24 hours at 200° F. The treated hydrogel particles were thereafter base-exchanged, washed, dried and calcined as in Examples 4–7.

The catalysts of Examples 17, 18 and 19 prepared in exactly the same manner as Example 16 except that the hot activation solution was (a) a 2 percent by weight aqueous solution of $H_2SO_4$ and 1 percent by weight $Zr(SO_4)_2 \cdot 4H_2O$; (b) a 2 percent by weight solution of $H_2SO_4$ and 5 percent by weight $$Zr(SO_4)_2 \cdot 4H_2O$$

and (c) 5 percent weight aqueous solution of $$Zr(SO_4)_2 \cdot 4H_2O$$

respectively.

The Cat-C evaluations of these catalysts are set forth in Table VII:

Table VII

| Example | 16 | 17 | 18 | 19 |
|---|---|---|---|---|
| Description | (a) | (a) | (a) | (a) |
| Activation: |  |  |  |  |
| Percent $H_2SO_4$ | 2 | 2 | 2 | ---- |
| Percent $Zr(SO_4)_2 \cdot 4H_2O$ | ---- | 1 | 5 | 5 |
| Time, hrs. | ←————24————→ | | | |
| Temp., ° F. | ←————200————→ | | | |
| Final pH | 3.9 | 3.0 | 1.8 | 2.5 |
| Physical properties: |  |  |  |  |
| Pore Volume, cc./g. | 0.65 | 0.60 | 0.47 | 0.57 |
| Apparent Dens. g./cc.: |  |  |  |  |
| Fresh | 0.57 | 0.61 | 0.66 | 0.62 |
| Steamed [b] | 0.65 | 0.73 | 0.78 | 0.76 |
| Surface area: Fresh | 621 | 638 | 655 | 630 |
| Composition: |  |  |  |  |
| $ZrO_2$, weight percent | 5.4 | 6.3 | 7.6 | 8.9 |
| Na, weight percent | 0.04 | 0.02 | 0.006 | 0.004 |
| $SO_4$, weight percent | <0.09 | <0.09 | <0.09 | 0.21 |

CAT-C EVALUATION OF STEAMED [b] CATALYSTS

| Conversion, vol. percent | 42.6 | 47.2 | 47.4 | 49.1 |
| Gasoline, vol. percent | 39.1 | 42.3 | 42.5 | 43.7 |
| Difference from $SiO_2$—$Al_2O_3$: [c] |  |  |  |  |
| Gasoline, vol. percent | +3.3 | +3.6 | +3.5 | +4.0 |
| Coke, weight percent | −0.2 | −0.4 | −0.8 | −0.9 |

[a] Formed at 8.5 pH.
[b] Steamed 20 hrs. at 1225° F. in 100% steam at atmospheric pressure.
[c] Value for $SiO_2$—$ZrO_2$ catalyst minus value for $SiO_2$—$Al_2O_3$ at same conversion.

The following example illustrates the preparation of a silica-zirconia catalyst having improved diffusion properties by incorporating 40 percent weight of zircon sand (on a finished catalyst basis), ground to 1–5 micron particle size.

EXAMPLE 20

A silica-zirconia catalyst was prepared in bead form by mixing streams of:
(1) Dilute sodium silicate solution containing suspended fines.
(2) Acid-zirconium sulfate solution.

The sodium silicate solution was prepared by dispersing 7.25 pounds of a slurry of zircon sand fines in 17 pounds of N-brand sodium silicate diluted with 7 pounds of water. The fines were milled 24 hours dry and 72 hours in 50 percent (weight) water slurry to 1–5 micron diameter. This solution contained, on a weight basis, 54.4 percent N-Brand sodium silicate, 11.6 percent fines, and 34 percent water.

The acid-zirconium sulfate solution was prepared by adding 1.55 pounds of 95 percent weight $H_2SO_4$ to a solution of 2.78 pounds of zirconium sulfate in 37.7 pounds of water. This solution contained 6.61 percent by weight $Zr(SO_4)_2 \cdot 4H_2O$, 89.7 percent by weight water and 3.69 percent by weight $H_2SO_4$. The zirconia content of this solution was 0.0227 g. $ZrO_2$/cc.

Three hundred and fifty six (356) cc. per minute of the sodium silicate-fines slurry and 386 cc. per minute of the acid-zirconium sulfate solution were mixed in a mixing nozzle to form a sol, which set to a hydrogel in 2.3 seconds at 71° F. The sol formed into spheroidal hydrogel beads by introducing globules of the sol in an oil medium. The resulting hydrogel particles having a pH of 7.7 were contacted with 1 percent by weight aqueous solution of $H_2SO_4$ for 24 hours at 200° F. The treated hydrogel particles were thereafter base-exchanged, washed, dried and calcined as in Examples 4–7.

Physical and catalytic properties of the resulting silica-zirconia bead catalyst are presented below in Table VIII:

*Table VIII*

Physical properties:
Pore volume, cc./g_____ 0.44
Apparent density, g./cc.:
  Fresh _____ 0.83
  Steamed [a] _____ 0.88
Surface area, m.²/g.:
  Fresh _____ 355
  Steamed [a] _____ 224
Analysis:
  $ZrO_2$, percent weight_____ 32.5
  Na, percent weight_____ 0.01
  $SO_4$, percent weight_____ <0.10

CAT-C EVALUATION OF STEAMED [a] CATALYST
Conversion, vol. percent_____ 46.3
Gasoline, vol. percent_____ 42.0
Difference from $SiO_2$—$Al_2O_3$: [b]
  Gasoline, vol. percent_____ +4.0
  Coke, wt. percent_____ −0.2

[a] Steamed 20 hrs. at 1,225° F. in 100% steam at atmospheric pressure.
[b] Value for $SiO_2$—$ZrO_2$ catalyst minus value for $SiO_2$—$Al_2O_3$ at the same conversion.

Examples 22 and 23 set forth below respectively illustrate the preparation of silica-zirconia and silica-zirconia-alumina catalysts by incorporating finely ground silica-zirconia gel fines and alpha-alumina into the hydrosols during formation.

EXAMPLE 21

Silica-zirconia gel was prepared by mixing streams of:
(1) A slurry of sodium silicate containing silica-zirconia gel fines.
(2) Acid-zirconium sulfate solution.

The sodium silicate slurry was prepared by dispersing 7.27 pounds of a 20 percent by weight aqueous slurry of silica-zirconia gel fines having a weight mean particle diameter of 1.5 microns into 23.34 pounds of dilute N-Brand sodium silicate solution. The ultimate solution having a specific gravity of 1.230 at 75° F. contained on a weight basis 55.4 percent N-Brand sodium silicate, 39.85 percent water and 4.75 percent silica-zirconia fines.

The acid-zirconium sulfate solution was prepared by dissolving 8.37 pounds of zirconium sulfate in 87.33 pounds of water and adding 3.96 pounds of sulfuric acid. The ultimate solution having a specific gravity of 1.084 at 60° F. contained on a weight basis 87.81 percent water, 8.36 percent zirconium sulfate and 3.83 percent sulfuric acid.

Four hundred thirty-two (432) cc. per minute of the sodium silicate fines slurry and 392 cc. per minute of the acid-zirconium sulfate solution were mixed in a mixing nozzle to form a sol which set to a hydrogel in 2 to 3 seconds at 52° F. The sol was formed into spheroidal hydrogel beads by introducing globules of the sol in an oil medium. The resulting hydrogel particles having a pH of 7.2 were contacted with water at a room temperature of about 70° F. for 4 hours and then contacted with a solution of 3 percent by weight sulfuric acid for 3 hours at 200° F. The treated hydrogel particles were thereafter washed 43 hours substantially free of sulfate ion, dried at 250–300° F. in steam, calcined 5 hours at 1400° F. in air and steamed for 10 hours at a pressure of 15 p.s.i.g. and a temperature of 1200° F. Physical and catalytic properties of the resulting product are shown hereinafter in Table IX.

EXAMPLE 22

Silica-zirconia gel containing finely divided alumina was prepared by mixing streams of:
(1) A slurry of sodium silicate containing alumina fines
(2) Acid-zirconium sulfate solution.

The sodium silicate slurry was prepared by dispersing 27.27 pounds of a 25 percent by weight aqueous slurry of alumina fines having a weight mean particle diameter of 4.4 microns into 31.91 pounds of N-brand sodium silicate diluted with 0.82 pound of water. The ultimate solution having a specific gravity of 1.309 at 75° F., contained, on a weight basis, 53.18 percent N-Brand sodium silicate, 20.3 percent alumina fines and 26.52 percent water.

The acid-zirconium sulfate solution was prepared by dissolving 16.4 pounds zirconium sulfate in 173 pounds of water and adding 10.4 pounds of sulfuric acid. The ultimate solution having a specific gravity of 1.095 at 60° F. contained on a weight basis, 86.75 percent water, 8.20 percent zirconium sulfate and 5.05 percent sulfuric acid.

Three-hundred seventy-eight (378) cc. per minute of the silicate slurry and 359 cc. per minute of the acid-zirconium sulfate solution were mixed in a mixing nozzle to form a sol which set to a hydrogel in 3 to 4 seconds at 55° F. The sol was formed into spheroidal hydrogel beads by introducing globules of the sol into an oil medium. The resulting hydrogel particles having a pH of 6.9 were contacted with water at a room temperature of about 70° F. for 4 hours and then contacted with a solution of 3 percent by weight sulfuric acid for 3 hours at 200° F. The final pH of the hydrogel was 2.1. The treated hydrogel particles were thereafter washed substantially free of sulfate ion over a period of about 60 hours, dried at 250 to 300° F. in steam, calcined 5 hours at 1400° F. and steamed for 10 hours at a pressure of 15 p.s.i.g. and a temperature of 1200° F. Physical and catalytic properties of the resulting product are shown below in Table IX.

*Table IX*

| Example | 21 | 22 |
| --- | --- | --- |
| Physical: | | |
| Apparent Density, g./cc.: | | |
| Fresh | 0.70 | 0.91 |
| Steamed [a] | 0.78 | 1.05 |
| Surface Area, m.²/g.: | | |
| Fresh | | |
| Steamed [a] | 179 | |
| Diffusivity: $Cm^2/sec. \times 10^3$ | | 14.8 |

GAS OIL CRACKING EVALUATION [a]

| Physical: | | |
| --- | --- | --- |
| Conversion, vol. percent | 42.5 | 50.9 |
| Gasoline, vol. percent | 35.2 | 40.5 |
| Difference from $SiO_2$—$Al_2O_3$: [b] | | |
| Gasoline, vol. percent | +4.1 | +5.3 |
| Coke, weight percent | −0.3 | −0.6 |

[a] Catalyst calcined 5 hours at 1400° F. and steamed 10 hours at 1,200° F. with steam at 15 p.s.i.g.
[b] Value for $SiO_2$—$ZrO_2$ catalyst minus value for $SiO_2$—$Al_2O_3$ at same conversion.

The above data show that active and selective silica-zirconia cracking catalyst can be prepared with improved diffusivity characteristics in accordance with the above technique. The catalyst of Example 22 had a diffusivity of 14.8 compared to a diffusivity of about 1 for silica-zirconia catalyst which did not contain added pulverized material. The catalysts showed good selectivity to gasoline with less coke formation than silica-alumina cracking catalyst at the same conversion. The gas oil cracking test utilized in evaluation of these catalysts was the same as the Cat-C test except that a temperature of 875° C., a space velocity of 1.5 and a catalyst-to-oil ratio of 4.0 were employed.

It will be understood that the above description is merely illustrative of preferred embodiments of the invention, of which many variations may be made by those skilled in the art without departing from the spirit thereof.

We claim:

1. A process for preparing a catalytic composite of silica and zirconia which comprises reacting a water-soluble zirconium compound and a silicate selected from the group consisting of an alkali metal silicate and an organic silicate ester to effect formation of a gelable sol consisting essentially of silica and zirconia characterized by a pH in excess of 6 and a zirconia content, on a dry solids basis, of between about 2 and about 20 percent by weight, permitting the said sol to set forming a silica-zirconia gel, reducing the pH of said gel to below 5 and maintaining the gel under such conditions of reduced pH while in contact with an aqueous acidic solution at a temperature in the approximate range of 150 to 220° F. for a period of at least about 1 hour under conditions of substantially atmospheric pressure, thereafter washing the gel free of soluble matter, drying and calcining.

2. A process for preparing a catalytic composite of silica and zirconia which comprises reacting a water-soluble zirconium compound and a silicate selected from the group consisting of an alkali metal silicate and an organic silicate ester to effect formation of a gelable sol consisting essentially of silica and zirconia characterized by a pH in excess of 6 and a zirconia content, on a dry solids basis, of between about 5 and about 15 percent by weight, permitting the said sol to set forming a silica-zirconia gel, reducing the pH of said gel to below 3 and maintaining the gel under such conditions of reduced pH while in contact with an aqueous acidic solution at a temperature in the approximate range of 175 to 220° F. for at least about 2 hours under conditions of substantially atmospheric pressure, thereafter washing the gel free of soluble matter, drying and calcining.

3. A process for preparing a catalytic composite of silica and zirconia which comprises reacting a water-soluble zirconium compound and ethyl orthosilicate to effect formation of a gelable sol consisting essentially of silica and zirconia characterized by a pH in excess of 6 and a zirconia content, on a dry solids basis, of between about 2 and about 20 percent by weight, permitting the said sol to set forming a silica-zirconia gel, reducing the pH of said gel to below 5 and maintaining the gel under such conditions of reduced pH while in contact with an aqueous acidic solution at a temperature within the approximate range of 175 to 220° F. for a period of about 2 to about 24 hours under conditions of substantially atmospheric pressure, thereafter washing the gel free of soluble matter, drying and calcining.

4. A process for preparing a catalytic composite of silica and zirconia which comprises reacting in aqueous solution a water-soluble zirconium compound and an alkali metal silicate to effect formation of a gelable hydrosol consisting essentially of silica and zirconia characterized by a pH in excess of 6 but not greater than 10 and a zirconia content, on a dry solids basis, of between about 2 and about 20 percent by weight, permitting the said hydrosol to set forming a silica-zirconia hydrogel, reducing the pH of said hydrogel to below 5 but in excess of 1 and maintaining the hydrogel under such conditions of reduced pH while in contact with an aqueous acidic solution, at a temperature in the approximate range of 150 to 220° F. for at least about 1 hour under conditions of substantially atmospheric pressure, thereafter washing the gel free of soluble matter, drying and calcining.

5. A process for preparing a catalytic composite of silica and zirconia which comprises reacting in aqueous solution a water-soluble zirconium salt of a mineral acid and sodium silicate to effect formation of a gelable hydrosol consisting essentially of silica and zirconia characterized by a pH in excess of 6 and a zirconia content, on a dry solids basis, of between about 5 and about 15 percent by weight, permitting the said hydrosol to set forming a silica-zirconia hydrogel, reducing the pH of said hydrogel to within the approximate range of 1 to 3 and maintaining the hydrogel under such conditions of reduced pH while in contact with an aqueous acidic solution at a temperature within the approximate range of 175 to 220° F. for a period of about 2 and about 24 hours under conditions of substantially atmospheric pressure, thereafter washing the gel free of soluble matter, drying and calcining.

6. A process for preparing a catalytic composite of silica and zirconia which comprises reacting in aqueous solution zirconium sulfate and sodium silicate to effect formation of gelable hydrosol consisting essentially of silica and zirconia characterized by a pH in excess of 6 but not greater than 10 and a zirconia content, on a dry solids basis, of between about 5 and about 15 percent by weight, permitting the said hydrosol to set forming a silica-zirconia hydrogel, reducing the pH of said hydrogel to below 5 but in excess of 1 and maintaining the hydrogel under such conditions of reduced pH while in contact with an aqueous acidic solution at a temperature in the approximate range of 175 to 220° F. for a period of between about 1 and about 48 hours under conditions of substantially atmospheric pressure, thereafter washing the gel free of soluble matter, drying and calcining at a temperature between about 800 and about 1800° F.

7. A process for preparing a catalytic composite of silica and zirconia which comprises reacting in aqueous solution a water-soluble zirconium compound and an alkali metal silicate to effect formation of a gelable hydrosol consisting essentially of silica and zirconia characterized by a pH in excess of 6 and a zirconia content, on a dry solids basis, of between about 2 and about 20 percent by weight, permitting the said hydrosol to set forming a silica-zirconia hydrogel, contacting said hydrogel with a dilute aqueous solution of a reagent selected from the group consisting of a mineral acid, a mineral acid salt of zirconium and mixtures of said acid and said salt of such concentration as to reduce the pH of said hydrogel to below 5 and maintaining the hydrogel under such conditions of reduced pH while in contact with said solution at a temperature in the approximate range of 150 to 220° F. for at least about 1 hour under conditions of substantially atmospheric pressure, thereafter washing the hydrogel free of soluble matter, drying and calcining.

8. A process for preparing a catalytic composite of silica and zirconia which comprise reacting a water-soluble zirconium compound and an alkali metal silicate to effect formation of a gelable hydrosol consisting essentially of silica and zirconia characterized by a pH in excess of 6 but not greater than 10 and a zirconia content, on a dry solids basis, of between about 5 and about 15 percent by weight, permitting the said hydrosol to set forming a silica-zirconia hydrogel, contacting said hydrogel with a dilute aqueous solution of sulfuric acid to reduce the pH of said hydrogel to below 5 but in excess of 1 and maintaining the hydrogel under such conditions of reduced pH while in contact with said dilute solution of sulfuric acid at a temperature in the approximate range of 175 to 220° F. for at least about 2 hours under conditions of substantially atmospheric pressure, thereafter washing the gel free of soluble matter, drying and calcining within the approximate range of 800 to 1800° F.

9. A process for preparing spheroidal particles of a catalyst consisting essentially of silica and zirconia which comprises reacting a water-soluble zirconium compound and a silicate selected from the group consisting of an alkali metal silicate and an organic silicate ester to effect formation of a gelable sol consisting essentially of silica and zirconia characterized by a pH in excess of 6 and a zirconia content, on a dry solids basis, of between about 2 and about 20 percent by weight, introducing globules of the resulting hydrosol into a column of water-immiscible liquid wherein the globules of hydrosol set to spheroidal particles of hydrogel, effecting gelation of said spheroidal hydrosol particles, reducing the pH of said spheroidal hydrogel particles to below 5 and maintaining said particles under such conditions of reduced pH while in contact with an aqueous acidic solution at a temperature in the approximate range of 150 to 220° F. for at least about 1 hour, under conditions of substantially atmospheric pressure, thereafter water washing the gel free of soluble matter, drying and calcining.

10. A process for preparing spheroidal particles of a catalyst consisting essentially of silica and zirconia which comprises reacting in aqueous solution a water-soluble zirconium compound and an alkali metal silicate to effect formation of a gelable sol consisting essentially of silica and zirconia characterized by a pH in excess of 6 but not greater than 10, a gelation time of less than 20 seconds, and a zirconia content, on a dry solids basis, of between about 2 and about 20 percent by weight, introducing globules of the resulting hydrosol into a water-immiscible fluid wherein the globules of hydrosol set to spheroidal particles of hydrogel, effecting gelation of said spheroidal hydrosol particles, reducing the pH of said particles to below 5 but in excess of 1 and maintaining the hydrogel particles under such conditions of reduced pH while in contact with an aqueous acidic solution at a temperature in the approximate range of 175 to 220° F., for at least about 1 hour, under conditions of substantially atmospheric pressure, water washing the gel free of soluble matter, drying and calcining at a temperature within the approximate range of 800 to 1800° F.

11. A process for the conversion of hydrocarbons which comprises contacting hydrocarbon vapor at conversion conditions of temperature and pressure with a catalyst consisting essentially of silica and zirconia and having a zirconia content of between about 2 and about 20 percent by weight, prepared by a process which comprises reacting a water-soluble zirconium compound and a silicate selected from the group consisting of an alkali metal silicate and an organic silicate ester to effect formation of a gelable sol consisting essentially of silica and zirconia characterized by a pH in excess of 6 and a zirconia content, on a dry solids basis, of between about 2 and about 20 percent by weight, permitting the said sol to set forming a silica-zirconia gel, reducing the pH of said gel to below 5 and maintaining the gel under such conditions of reduced pH while in contact with an aqueous acidic solution at a temperature in the approximate range of 150 to 220° F. for a period of at least about 1 hour under conditions of substantially atmospheric pressure, thereafter washing the gel free of soluble matter, drying and calcining.

12. A process for the conversion of hydrocarbons which comprises contacting hydrocarbon vapor at conversion conditions of temperature and pressure with a catalyst consisting essentially of silica and zirconia and having a zirconia content of between about 2 and about 20 percent by weight, prepared by a process comprising reacting in aqueous solution a water-soluble zirconium compound and an alkali metal silicate to effect formation of a gelable hydrosol consisting essentially of silica and zirconia characterized by a pH in excess of 6 but not greater than 10 and a zirconia content, on a dry solids basis, of between about 2 and about 20 percent by weight, permitting the said hydrosol to set forming a silica-zirconia hydrogel, reducing the pH of said hydrogel to below 5 but in excess of 1 and maintaining the hydrogel under such conditions of reduced pH while in contact with an aqueous acidic solution, at a temperature in the approximate range of 150 to 220° F. for at least about 1 hour under conditions of substantially atmospheric pressure, thereafter washing the gel free of soluble matter, drying and calcining.

13. A process for the conversion of hydrocarbons which comprises contacting hydrocarbon vapor at conversion conditions of temperature and pressure with a catalyst consisting essentially of silica and zirconia having a zirconia content of between about 5 and about 15 percent by weight prepared by reacting in aqueous solution a water-soluble zirconium salt of a mineral acid and sodium silicate to effect formation of a gelable hydrosol consisting essentially of silica and zirconia characterized by a pH in excess of 6 and a zirconia content, on a dry solids basis, of between about 5 and about 15 percent by weight, permitting the said hydrosol to set forming a silica-zirconia hydrogel, reducing the pH of said hydrogel to within the approximate range of 1 to 3 and maintaining the hydrogel under such conditions of reduced pH while in contact with an aqueous acidic solution at a temperature within the approximate range of 175 to 220° F. for a period of about 2 and about 24 hours under conditions of substantially atmospheric pressure, thereafter washing the gel free of soluble matter, drying and calcining.

14. A process for cracking a heavy petroleum oil to lighter materials boiling in the range of gasoline which comprises contacting said oil at catalytic cracking conditions with a catalyst consisting essentially of silica and zirconia having a zirconia content of between about 5 and about 15 percent by weight, prepared by reacting in aqueous solution zirconium sulfate and sodium silicate to effect formation of a gelable hydrosol consisting essentially of silica and zirconia characterized by a pH in excess of 6 but not greater than 10 and a zirconia content, on a dry solids basis, of between about 5 and about 15 percent by weight, permitting the said hyrosol to set forming a silica-zirconia hydrogel, reducing the pH of said hydrogel to below 5 but in excess of 1 and maintaining the hydrogel under such conditions of reduced pH while in contact with an aqueous acidic solution at a temperature in the approximate range of 175 to 220° F. for a period of between about 1 and about 48 hours under conditions of substantially atmospheric pressure, thereafter washing the gel free of soluble matter, drying and calcining at a temperature between about 800 and about 1800° F.

15. A hydrocarbon conversion catalyst consisting essentially of silica and zirconia having a zirconia content of between about 2 and about 20 percent by weight, prepared by reacting a water-soluble zirconium compound and a silicate selected from the group consisting of an alkali metal silicate and an organic silicate ester to effect formation of a gelable sol consisting essentially of silica and zirconia characterized by a pH in excess of 6 and a zirconia content, on a dry solids basis, of between about 2 and about 20 percent by weight, permitting the said sol to set forming a silica-zirconia gel, reducing the pH of said gel to below 5 and maintaining the gel under such conditions of reduced pH while in contact with an aqueous acidic solution at a temperature in the approximate range of 150 to 220° F. for a period of at least about 1 hour under conditions of substantially atmospheric pressure, thereafter washing the gel free of soluble matter, drying and calcining.

16. A hydrocarbon conversion catalyst consisting essentially of silica and zirconia having a zirconia content of between about 2 and about 20 percent by weight prepared by reacting in aqueous solution a water-soluble zirconium compound and an alkali metal silicate to effect formation of a gelable hydrosol consisting essentially of silica and zirconia characterized by a pH in excess of 6 but not greater than 10 and a zirconia content, on a dry solids basis, of between about 2 and about 20 percent by weight, permitting the said hydrosol to set forming a silica-zirconia hydrogel, reducing the pH of said hydrogel to below 5 but in excess of 1 and maintaining the hydrogel under such conditions of reduced pH while in contact with an aqueous acidic solution, at a temperature in the approximate range of 150 to 220° F. for at least about 1 hour under conditions of substantially atmospheric pressure, thereafter washing the gel free of soluble matter, drying and calcining.

17. A hydrocarbon conversion catalyst consisting essentially of silica and zirconia having a zirconia content of between about 5 and about 15 percent by weight prepared by reacting in aqueous solution a water-soluble zirconium salt of a mineral acid and sodium silicate to effect formation of a gelable hydrosol consisting essentially of silica and zirconia characterized by a pH in excess of 6 and a zirconia content, on a dry solids basis, of between about 5 and about 15 percent by weight, permitting the said hydrosol to set forming a silica-zirconia hydrogel, reducing the pH of said hydrogel to within the approximate range of 1 to 3 and maintaining the hydrogel under such conditions of reduced pH while in contact with an aqueous acidic solution at a temperature within the approximate range of 175 to 220° F. for a period of about 2 and about 24 hours under conditions of substantially atmospheric pressure, thereafter washing the gel free of soluble matter, drying and calcining.

18. A catalyst composition in the form of spheroids consisting essentially of silica and zirconia having a zirconia content of between about 2 and about 20 percent by weight prepared by reacting in aqueous solution a water-soluble zirconium compound and an alkali metal silicate to effect formation of a gelable sol consisting essentially of silica and zirconia characterized by a pH in excess of 6 but not greater than 10, a gelation time of less than 20 seconds, and a zirconia content, on a dry solids basis, of between about 2 and about 20 percent by weight, introducing globules of the resulting hydrosol into a water-immiscible fluid wherein the globules of hydrosol set to spheroidal particles of hydrogel, effecting gelation of said spheroidal hydrosol particles, reducing the pH of said particles to below 5 but in excess of 1 and maintaining the hydrogel particles under such conditions of reduced pH while in contact with an aqueous acidic solution at a temperature in the approximate range of 175 to 220° F., for at least about 1 hour, under conditions of substantially atmospheric pressure, water-washing the gel free of soluble matter, drying and calcining at a temperature within the approximate range of 800 to 1800° F.

19. A process for preparing a gel composite comprising silica and zirconia which comprises reacting a water-soluble zirconium compound and an alkali metal silicate having dispersed therein between about 2 percent and about 40 percent by volume of the dried gel product of a solid powdered material characterized by insolubility in the resulting hydrosol, infusibility at the temperature of calcination of the resulting gel and a weight mean particle diameter of between about 1 and about 5 microns to effect formation of a gelable sol comprising silica and zirconia characterized by a pH in excess of 6 and a zirconia content, on a dry solids basis, of between about 2 and about 20 percent by weight, permitting the said sol to set forming a gel comprising silica and zirconia, reducing the pH of said gel to below 5 and maintaining the gel under such conditions of reduced pH while in contact with an aqueous acidic solution at a temperature in the approximate range of 150 to 220° F. for a period of at least about 1 hour under conditions of substantially atmospheric pressure, thereafter washing the gel free of soluble matter, drying and calcining.

20. A gel composite comprising silica and zirconia having a zirconia content of between about 2 and about 20 percent by weight, prepared by reacting a water-soluble zirconium compound and an alkali metal silicate having dispersed therein between about 2 percent and about 40 percent by volume of the dried gel product of a solid powdered material characterized by insolubility in the resulting hydrosol, infusibility at the temperature of calcination of the resulting gel and a weight mean particle diameter of between about 1 and about 5 microns to effect formation of a gelable sol comprising silica and zirconia characterized by a pH in excess of 6 and a zirconia content, on a dry solids basis, of between about 2 and about 20 percent by weight, permitting the said sol to set forming a gel comprising silica and zirconia, reducing the pH of said gel to below 5 and maintaining the gel under such conditions of reduced pH while in contact with an aqueous acidic solution at a temperature in the approximate range of 150 to 220° F. for a period of at least about 1 hour under conditions of substantially atmospheric pressure, thereafter washing the gel free of soluble matter, drying and calcining.

References Cited in the file of this patent

UNITED STATES PATENTS 2,477,638     Milliken     Aug. 2, 1949